(12) United States Patent
Kim et al.

(10) Patent No.: US 6,172,152 B1
(45) Date of Patent: Jan. 9, 2001

(54) SOL-GEL COMPOSITIONS AND POLYMERIC ION CONDUCTIVE FILM PREPARED THEREFROM

(75) Inventors: Eun-Kyong Kim; Myung-Hoon Lee; Sung-Tai Ko; Kwang-Sup Lee, all of Taejeon; Yong-Bong Han, Chollagbook-do; Suh-Bong Rhee; Chang-Jin Lee, both of Taejeon, all of (KR)

(73) Assignee: Korea Research Institute (KR)

( * ) Notice: Under 35 U.S.C. 154(b), the term of this patent shall be extended for 0 days.

(21) Appl. No.: 09/132,291

(22) Filed: Aug. 11, 1998

(30) Foreign Application Priority Data

Aug. 12, 1997 (KR) .................................................. 97-38308

(51) Int. Cl.[7] ................................ C08K 5/05; C08K 5/15; C08K 5/34; C08L 27/14; C08L 47/00
(52) U.S. Cl. .......................... 524/379; 524/104; 524/113; 524/205; 524/233; 524/378; 524/280; 525/104; 525/105
(58) Field of Search ..................................... 524/104, 113, 524/205, 233, 378, 280, 379; 525/104, 105

(56) References Cited

U.S. PATENT DOCUMENTS 5,958,115 * 9/1999 Bottcher et al. .................. 106/14.05

* cited by examiner

*Primary Examiner*—Robert Dawson
*Assistant Examiner*—Jeffrey B. Robertson
(74) *Attorney, Agent, or Firm*—Blakely, Sokoloff, Taylor & Zafman LLP (57) ABSTRACT

The present invention provides a sol-gel composition which comprises a mixture of a polyalkylene glycol-substituted trialkoxysilane (PAGTAS), a polyalkylene glycol and/or alkyl ether, a tetraalkoxysilane (TAOS), a hydrochloric acid, at least one organic solvent and/or a lithium salt, which mixture is optionally concentrated; a polymeric ion conductive film obtained by coating said compositions with a conventional solution processing method and solid electrochemical elements using the same. According to the present invention, a polymeric ion conductive film having no phase separation, strong adhesiveness for electrode, and ion conductivity of at least $1 \times 10^{-4}$ S/cm at room temperature is provided.

18 Claims, 4 Drawing Sheets

SOL-GEL COMPOSITIONS AND POLYMERIC ION CONDUCTIVE FILM PREPARED THEREFROM

TECHNICAL FIELD

The present invention relates to sol-gel composition, polymeric ion conductive films prepared therefrom and a method for preparing the same. Specifically, this invention relates to ion conductive sol-gel composition which is easy to process and from which an ion conductive film can be easily prepared, and provides a polymeric ion conductive film having an excellent mechanical strength and high lithium ion conductivity at room temperature and a method for preparing the same. More specifically, this invention is intended to provide ion conductive sol-gel composition comprising a polyalkylene glycol-substituted trialkoxysilane (PAGTAS) such as polyethylene glycol-substituted trialkoxysilane (PEGTAS), a tetraalkoxysilane (TAOS) such as tetraethoxysilane (TEOS) and an alkaline metal salts such as lithium salt as major components, and a polymeric ion conductive film having an excellent mechanical property, strong adhesiveness, and high ion conductivity at room temperature, and a method for preparing the same by processing the ion conductive sol-gel compositions. Preferably, the ion conductive sol-gel composition of this invention comprises a polyalkylene glycol-substituted trialkoxysilane (PAGTAS), a tetraalkoxysilane (TAOS) and an alkaline metal salt.

Compared with conventional electrochemical devices using liquid electrolytes, electrochemical devices using solid electrolytes are advantageous in that they avoid solution leaking problems, can be prepared in thin-film form, and can be used in portable electronics or automobiles due to their small size. Particularly, solid polymeric electrolyte thin films have been the focus of concentrated research and development efforts because they can provide chemical cells with high charging-discharging efficiency; cells made from them can adapt various shapes and are light-weight.

For preparing solid chemical cells having such advantages, a method for using polymeric compounds as electrolytes is recently being developed. This is because polymers can be processed into thin films, can dissolve salts and have ion permeability and thus polymers can be used as electrolytes. Solid electrolytes also are advantageous in that they have low cell resistance and high electrical current under low electric current density.

As described above, such polymeric electrolyte thin films (ion conductive thin films) used in solid chemical cells should have good ion conductivity and mechanical property; however, it is difficult to improve both of these properties just by altering physical properties such as molecular weight of the polymer matrix or glass transition temperature. Therefore, it is required to develop new polymeric electrolytes which have both improved ion conductivity and mechanical property.

Bauer et al., in U.S. patent application Ser. No. 4,654,279, disclosed a cell using a two continuous phase network of conductive liquid polymers of a continuous network of a cross-linked polymers to improve mechanical properties of solid electrolytes and of an ion conductive phase which provides pathways for delivering ions through a matrix of the mechanical supporting phase.

Le Mehaute et al., in U.S. patent application Ser. No. 4,556,614, disclosed solid electrolytes for electrochemical devices containing at least one type of complex forming polymers and at least one type of ionizable alkali salts complexed with said polymers, and a method for producing such solid electrolytes in which said complex forming polymers are mixed in amorphous form during the process of cross-linking.

Xia et al. disclosed polymeric electrolytes prepared by polymerizing oligo-oximethylmethaacrylate (Solid State Ionics, 1984, 14, 221~224).

However, polymeric electrolytes prepared in the above-mentioned inventions have problems when actually applied to electrochemical devices; for example, the ion conductivity of the polymeric thin films so prepared varies greatly with temperature and the ion conductivity at room temperature varies with time because it was difficult to prepare a completely non-crystalline (amorphous) thin film. Moreover, such polymeric thin films were difficult to be applied to batteries or solid electrochemical devices in that, ion conduction occurs by the chain movement of polyoxyethylene units substituted as side-chains to the polymer back bone. Such chain movement of polyoxyethylene side chains is generally slow and thus ion conduction in these polymeric films is inefficient.

Therefore, polymeric electrolytes prepared by such methods have low ion conductivity (less than $1\times10^{-5}$ S/cm). Furthermore, poor adhesiveness of these electrolyte films for electrodes causes problems such as the cracking of the electrolytic film, reducing the cycle life of electrochemical devices.

To solve these problems, polysiloxane derivatives having a more flexible chain structure and low glass transition temperature have been under development. Smid et al. and Fish et al. disclosed their findings where crystallization of polyethylene glycol (PEG) is prevented and ion conductivity at room temperature is improved by attaching low molecular weight polyethyleneglycol (PEG) units to a side-chain of poly(hydrogen methylsiloxane) (J. Smid, D. Fish, I. M. Khan, E. Wu, G. Zhou, Silicon-based Polymer Science: A Comprehensive Resource, 113–123; Daryle Fish, Ishrat M. Khan, Johannes Smid, *Makromol. Chem., Rapid Commun.*, 7, (1986) 115–120). However, in this case, the polymers have been cross-linked to maintain mechanical strength, but the cross-linked polymers have lower ion conductivity.

Moreover, Bouridah et al. disclosed polyurethane-derived polymers based on polydimethylsiloxane-PEO (A. Bouridah, F. Dalard, D. Deroo, *Solid State Ionics*. 15, (1985) 233), but it is difficult to actually use them in electrochemical devices because the unreacted residual isocyanate group lowers electrochemical stability.

SUMMARY OF THE INVENTION

To solve these problems, the inventors of the present invention researched on polymers having rubber elasticity and ion conductivity and, in particular, they focused on siloxane polymer matrix containing a polyoxyethylene block to give ion conductivity. As a result, the inventors found that homogenous composition can be prepared by adding a polyethyleneglycol substituted trialkoxysilane, namely a sol-gel precursor into a sol-gel mixture; an ion conductive polymeric thin film prepared therefrom shows excellent mechanical property.

More specifically, the inventors found that a sol-gel precursor substituted with polyalkyleneoxy units can be dissolved in conventional organic solvents and developed a method for preparing a polymeric ion conductive film having an excellent mechanical property, from compositions containing such sol-gel precursor, tetraalkoxysilane (TAOS) and polyalkyleneoxyglycol or/and its ether, and electrolytic salts such as lithium salts. It was found that the conductivity at room temperature of the ion conductive film so produced has improved to be higher than $10^{-4}$ S/cm and solid electrolyte film with excellent adhesiveness can be formed when an appropriate amount of electrolytic salts is mixed. Such polymeric ion conductive film can be separated as free standing film after preparation, is electrochemically stable, has excellent adhesiveness in case of readhesion, and can be used in lithium ion cells and solid electrochemical devices.

DISCLOSURE OF THE INVENTION

An object of the present invention is to provide a sol-gel composition containing 1~90% by weight of a polyalkyleneglycol-substituted trialkoxysilane of Formula 1, 10~95% by weight of tetraalkoxysilane (TAOS), hydrochloric acid, organic solvent, and a 1~90% by weight of a polyalkyleneglycol of Formula 2 and/or an alkyl ether thereof, and optionally 1~70% by weight of a lithium salt of Formula 3. Such sol-gel composition can be prepared with high viscosity when concentrated by 10~90% relative to its weight before or after adding the lithium salts.

[Formula 1]

[Formula 2]
$R^2$—O—$(CR^3{}_2$—$CR^3{}_2$—O$)_z$—$R^2$

[Formula 3]

In the above formulae:
R is a lower alkyl group containing less than 10 carbon atoms such as methyl, ethyl, propyl or the like, x has a value of between 1 to 10, $R^1$ is the same as R or is —$(CR^3{}_2$—$CR^3{}_2$—O$)_y$—R (where y has a value of between 1 to 50),
$R^2$ is H or is the same as R, $R^3$ is H, $CH_3$, or F, and z has a value of between 1 to 50, $A^+$ represent a cation such as $Li^+$, $Na^+$ and $K^+$ and $B^-$ represents an anion such as $ClO_4^-$, $CF_3SO_3^-$, $N(CF_3SO_3)_2^-$, $BF_4^-$, $PF_6^-$, $AsF_6^-$ or the like.

Another object of this invention is to provide a method for the preparation of a sol-gel composition which is characterized in that a polyalkyleneglycol-substituted trialkoxysilane of Formula 1 is mixed with a tetraalkoxysilane (TAOS), hydrochloric acid, organic solvent, and a polyethyleneoxyglycol of Formula 2 and/or its alkyl ether, and optionally further mixed with a lithium salt of Formula 3, the mixture thereof is stirred at a temperature of less than 130° C. and is optionally concentrated. The concentration of the sol-gel composition can be carried out before or after the addition of the lithium salt, at a reduced pressure or under the atmospheric pressure.

Still another object of the invention is to provide an ion conductive film. Such film is prepared by coating the above-mentioned ion conductive sol-gel composition onto an electrode or holder using a conventional solution processing method such as spin coating, casting, deep-coating, or bar-coating; the film so prepared has an ion conductivity of $10^{-3}$~$10^{-8}$ S/cm at room temperature.

The present invention also provides an immersion-treated polymeric ion conductive film in which the above-mentioned polymeric ion conductive film is immersed with a solution in which electrolytic salts are dissolved.

Furthermore, present invention is intended to provide a lithium battery or other solid electrochemical devices prepared by using such polymeric ion conductive film.

The present invention is now described in detail.

According to the specification of this invention, "sol-gel precursor" represents trialkoxysilane substituted with polyethyleneoxy units, and "sol-gel composition" represents a composition containing said sol-gel precursor.

Thus, polyalkyleneglycol-substituted trialkoxysilane (PAGTAS) of Formula 1, referred to as a "sol-gel precursor", can be prepared from, for example, polyethyleneglycol akyl ether and 3-isocyanatopropyltrialkoxysilane (IP-TAOS).

The sol-gel composition with high viscosity according to the present invention is prepared by stirring the sol-gel composition containing an organic solvent at a temperature of room temperature to 130° C. Which is then concentrated by 10~90% by weight under atmospheric pressure or at a reduced pressure. In accordance with the specification of this invention, unless otherwise indicated, "sol-gel composition" includes both concentrated or unconcentrated sol-gel compositions, and "ion conductive sol-gel composition" represents sol-gel compositions containing an electrolytic salt such as lithium salt and the like but it is not strictly differentiated.

The "sol-gel compositions with high viscosity" is prepared by concentrating the sol-gel composition before or after mixing the lithium salt, thus it may or may not contain lithium salt. The organic solvent used in this invention is selected from conventional organic solvents such as ethanol, methanol, tetrahydrofuran, acetonitrile, NMP, dimethylformamide (DMF), propylene carbonate and dimethoxyethane, and may be used at a ratio of 1~70% by weight in the ion conductive sol-gel compositions.

The polymeric ion conductive film of the present invention can be prepared by further adding a plasticizer, a thickening agent and a hardener or other ion conductive polymers to the ion conductive sol-gel compositions of the present invention within the scope of the object of this invention. Examples for such additives include a silica, a carbon black, a natural graphite, an artificial graphite, an ethylene-propylene-diene terpolymer (EPDM) and a polyvinylfluoride (PVDF), etc.

Further, the polymeric ion conductive film according to this invention can be immersion-treated with a solution containing an electrolytic salt to prepare an immersion-treated polymeric ion conductive film. The period for the immersion is not limited, but generally it's 1 hour to 1 week.

The ion conductive sol-gel compositions of the present invention and polymeric ion conductive film prepared therefrom contain polyalkyleneglycol-substituted trialkoxysilane (PAGTAS) of Formula 1, tetraalkoxysilane (TAOS) and/or lithium salts as main components.

According to this invention, when the sol-gel composition is prepared, the phase separation between lithium salt and the mixture and the phase of organic-inorganic polymeric chains can be reduced by using the polyalkyleneglycol-substituted trialkoxysilane (PAGTAS) of Formula 1. Thus, the polymeric ion conductive film having siloxane polymeric matrix prepared from said composition can maintain excellent mechanical strength at room temperature.

This invention provides a polymeric ion conductive film which is easy to prepare, has excellent mechanical strength and strong adhesiveness, and has high ion conductivity at room temperature.

The polyethyleneglycol-substituted trialkoxysilane used as basic material for the siloxane polymeric matrix of this invention is obtained by reacting polyethyleneglycol monoalkyl ether with isocyanatoalkyltrialkoxysilane (IA-TAOS) such as 3-isocyanatopropyltriethoxysilane (IP-TEOS) in the presence of a catalyst.

For example, a sol-gel precursor (PAGTAS) used in this invention is prepared by the following method: a THF solution of polyethyleneglycol monomethylether (PEGMe) is added to a THF solution of IP-TEOS at room temperature, and then a catalyst (for example, di-n-butyltyn dilaurate) is added dropwise; the mixture is then stirred for 5 to 12 hours while the reaction temperature is maintained at 60 to 80° C. The product is precipitated by adding hexane-THF solution to the above reaction mixture, and then distilled in vacuum to obtain PAGTAS. Commercially available IP-TEOS can be used for this procedure.

The ion conductive sol-gel compositions of this invention can be prepared by, for example, the following two methods.

A first method includes purifying the sol-gel precursor (PAGTAS) represented by Formula 1, the purification being followed by the addition of TAOS, an aqeous solution of hydrochloric acid, an organic solvent, polyalkyleneglycol (PAG) or its derivatives represented by Formula 2, the mixture then being stirred for 0.2 to 10 days at room temperature, and then heated up to 30 to 70° C.; thereafter, being stirred again for 0.2 to 10 days. To the sol-gel composition obtained, 1 to 70% by weight of a lithium salt relative to the weight of the composition is added as an eletrolytic salt and the resultant mixture is stirred at room temperature to provide an ion conductive sol-gel composition. The resulted ion-conductive sol-gel composition can be concentrated by 10~90% relative its weight to form a highly viscose mixture before or after adding the lithium salt.

A second method includes purifying the sol-gel precursor (PAGTAS), the purification being followed by the addition of TAOS, an aqueous solution of hydrochloric acid, and an organic solvent thereto, the mixture then being stirred at room temperature, and heated to 30 to 70° C. and stirred again; thereto, a lithium salt and polyalkyleneglycol and/or its derivatives being added and the mixture being stirred at 30 to 70° C. to provide an ion conductive sol-gel composition. The ion conductive sol-gel composition so obtained can be formed into a highly viscose ion conductive sol-gel compositions when concentrated before or after the addition of the lithium salt as in the first method.

In the preparation of the ion conductive sol-gel composition, a lithium salt of Formula 3 can be added either before or after the sol-gel composition is concentrated, and the amount added corresponds to 1 to 70% by weight relative to the weight of the composition.

The organic solvent used in the preparation of the sol-gel composition is one or more organic solvent (s) selected from the group consisting of ethanol, methanol, tetrahydrofuran, acetonitrile, N-methylpyrrolidon (NMP), dimethylformamide (DMF), propylene carbonate and dimethoxyethane, and can be used alone or as a mixture of them. The organic solvent(s) can be added at a ratio of 1 to 70% by weight relative to the weight of the composition.

In addition, acidic catalysts such as acetic acid, trifluoroacetic acid, and other organic acids or alkali catalysts such as pyridine, 4-(N,N-dimethylamino)pyridine and cobalt dichloride can be used to promote sol-gel reaction in the above composition.

The obtained ion conductive sol-gel composition is coated by a conventional solution coating method on to a support and subjected to a treatment at a reduced pressure or under atmospheric pressure at 30 to 130° C. to prepare a polymeric ion conductive film.

Particularly, when the ion conductive sol-gel composition is coated onto an electrode or a glass plate or other solid support using spin-coating, bar-coating or other conventional solution coating method at a temperature of 20 to 130° C. for 1 hour to 2 weeks, preferably for 1 day to 1 week at a reduced pressure or under atmospheric pressure, it is prepared a polysiloxane-based ion conductive thin film which is clear, has an excellent mechanical property, and is completely amorphous at room temperature. The ion conductive thin film has an ion conductivity of at least $1 \times 10^{-4}$ S/cm at room temperature.

According to the present invention, polyalkyleneoxyglycol and/or its derivatives reacts with IA-TAOS to form a sol-gel precursor, which is subjected to a hydrolysis and polymerization with TAOS in the presence of a catalyst to provide an organic-inorganic hybrid of polysiloxane matrix. Said matrix improves the mechanical property of the thin film ultimately obtained in the end.

Meanwhile, polyalkyleneoxy side chains of the PAGTAS act to provide an excellent compatibility with the polyalkyleneoxyglycol, electrolyte salt ($A^+B^-$), and or ether thereof added for the ion conductivity. The polyethyleneoxyglycol and/or ether thereof together with the polyalkyleneoxy side chains of the polysiloxane form a complex with the lithium salt cation through coordinate bond, thus allowing the thin film obtained therefrom to have ion conductive property. The polysiloxane network allows the thin film to maintain its mechanical property. In other words, the ion conductive film of the present invention has a characteristic structure which is consisted of a polysiloxane network of polyalkyleneoxyglycol and/or ether and sol-gel precursor; the polyalkyleneoxy side chains give it excellent mechanical property and superb ion conductivity.

The polyalkyleneoxyglycol and its derivatives is used in a molar ratio of 0.1 to 5 fold relative to the amount of the sol-gel precursor. If the amount of the polyalkyleneoxyglycol and its derivatives used is larger than the range mentioned above, phase separation occurs in the polymeric ion conductive film and the mechanical property of the thin film is thus reduced. On the other hand, if it's less than the above range, the ion conductivity of the thin film decreases.

The sol-gel precursor of this invention described above readily dissolves in common organic solvents such as acetonitrile, tetrahydrofuran, dichloromethane and aceton, and forms ion conductive sol-gel composition with electrolytic salt.

In this process, lithium salt is contained in the sol-gel composition at a molar ratio of 0.01 to 10 fold, preferably 0.1 to 5 fold, relative to the amount of the sol-gel precursor. If the lithium content is higher than the above range, the composition would crystallize and its ion conductivity decreases; if the content is lower than the above range, the ion concentration is low thus the ion conductivity decreases.

Other polymeric electrolytes such as polyethyleneoxide and polyvinylidenfluoride (PVdF) can be mixed into the composition to prepare a conductive film of the present invention.

To improve its heat-resistance, mechanical property or processability, various conventional additives known to those skilled in this field including anti-oxidants, dyes, pigments, lubricants, thickening agents, and the like and/or filling agents, for example silica, carbon black, natural graphite, artificial graphite, ethylene-propylene-diene terpolymer(EPDM) and/or polyvinyl fluoride (PVDF) can be further added to the composition of the present invention.

The polymeric ion conductive film according to the present invention is advantageous in that it can be prepared by film forming processes using common solution coating methods such as solution casting from the sol-gel composition of the invention, so that the process for preparing the thin film is simple and inexpensive. In addition, the polymeric ion conductive film having excellent adhesiveness can be produced in thin-films which have high ion conductivity at room temperature by adjusting the chain length of polyoxyalkylene and its end group. Therefore, the ion conductive film of the present invention has high possibility of being used in various electrochemical devices including batteries, sensors, electrochromic devices and the like.

BEST MODE FOR CARRYING OUT THE INVENTION

The present invention is now described in more detail with examples for reference, but the scope of this invention is not limited to the following examples.

The abbreviations used in the specification and examples are as follows:
PAGTAS: polyalkyleneglycol-substituted trialkoxysilane
PEGMe: polyethyleneglycol methyl ether
TEOS: tetraethoxysilane
IP-TEOS: 3-isocyanatopropyltriethoxysilane
THF: tetrahydrofuran
DMF: dimethylformamide
PEG: polyethyleneglycol
NMP: N-methylpyrrolidinone
Mn: number-average molecular weight

EXAMPLE 1 (Synthesis of sol-gel precursor: PAGTAS)

35 g of PEGMe (number-average molecular weight: 350, manufactured by Aldrich) dissolved in THF (40 ml) is slowly added into 25 g of IP-TEOS (manufactured by Aldrich) dissolved in THF (50 ml) at room temperature, and then 1 ml of di-n-butyltyne dilaurate is added to the mixture. The reaction solution is stirred for 8 hours while the temperature is maintained at 70° C. Then, the solvent is evaporated to produce a solid product. The product obtained is reprecipitated 2 to 3 times with hexane/THF (90:10% v/v), filtered and washed, and then dried to give a sol-gel precursor. The yield is 90%.

| Element analysis: | C (%) | H (%) | N (%) | O (%) |
|---|---|---|---|---|
| Calculated value: | 51.1 | 9.02 | 2.38 | 32.7 |
| Experimental value: | 51.7 | 8.98 | 2.28 | 31.9 |

Figure 1:
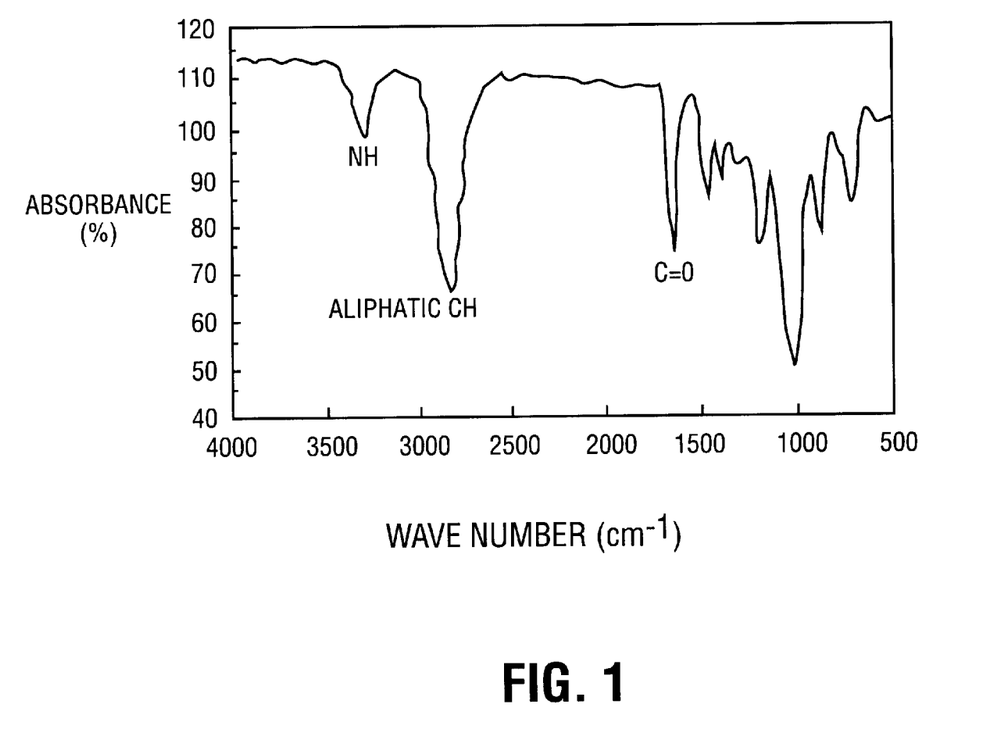

FIG. 1 shows the result of an infrared analysis of the resulted sol-gel precursor. The absorption band by —NCO near 2250 cm$^{-1}$ disappears and the absorption occurs around 3350 cm$^{-1}$~3400 cm$^{-1}$ (N—H stretching band of urethane), around 2800 cm$^{-1}$~2900 cm$^{-1}$ (C—H stretching band of aliphatic group), and around 1730 cm$^{-1}$ (C=O band of urethane. This suggests that the reactant, isocyanate group of the reactant, IP-TEOS, is completely substituted by polyethyleneoxyglycol monomethyl ether and converted to urethane group.

In addition, by analyzing the resulted sol-gel composition with $^1$H-NMR and $^{13}$C-NMR, the functional group peak corresponding to —NH of urethane is confirmed at 5.2 ppm in $^1$H-NMR, and the functional group peak corresponding to carbonyl group of urethane is confirmed at 157.5 ppm in $^{13}$C-NMR. This suggests that the sol-gel precursor of this invention is substituted by polyethyleneoxyglycol group and ethyleneoxy group.

Figure 2:
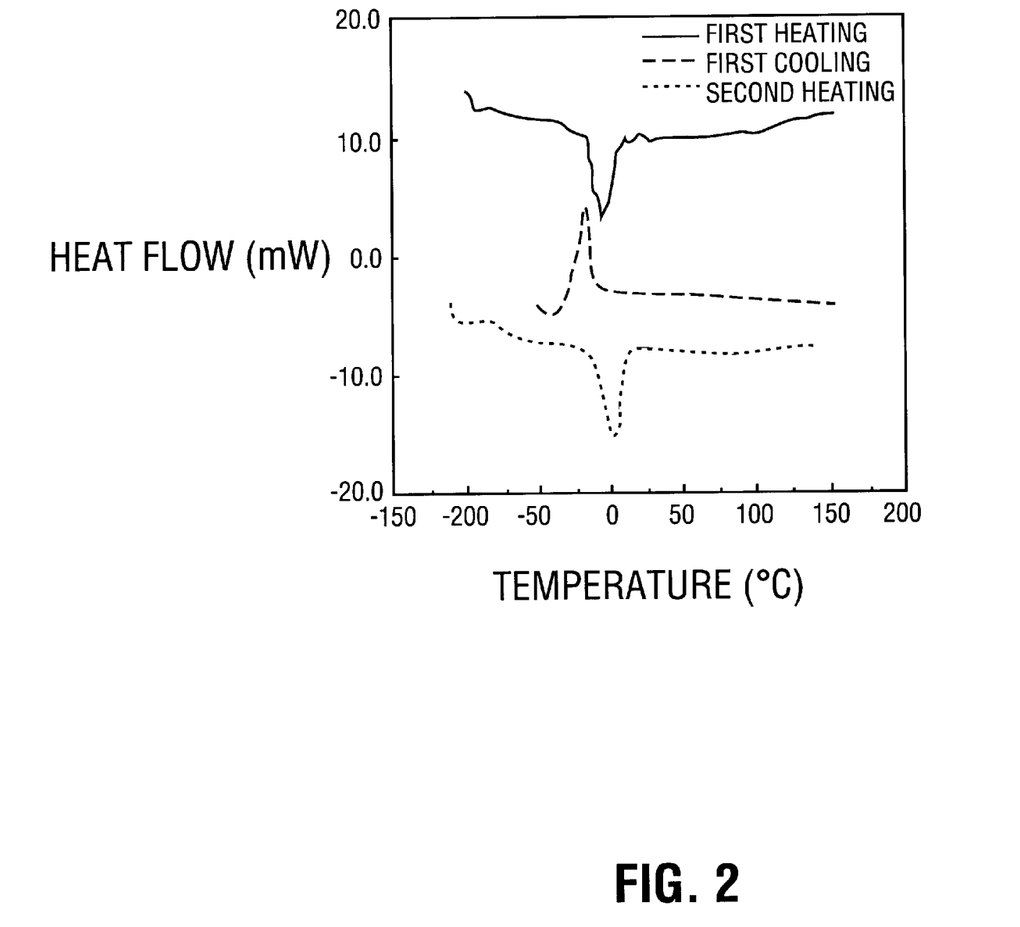

FIG. 2 shows the result of DSC analysis of the precursor, which shows a broad heat absorption peak corresponding to glass transision temperature (Tg) of about –68° C. and melting temperature (Tm) around –8° C.

EXAMPLES 2 to 3

Sol-gel precursors are prepared in the same manner as in Example 1 except changing the number-average molecular weight of PEGMe to 550 and 750, and the yield of the resulted sol-gel precursors respectively is shown in Table 1.

TABLE 1

| | | Polyethyleneoxyglycol Monomethyl ether | | |
|---|---|---|---|---|
| Example | IP-TEOS (g) | Number-average Molecular Weight (Mn) | Amount used (g) | Yield (g) |
| 2 | 12.5 | 550 | 27.5 | 25 |
| 3 | 13 | 750 | 37 | 30 |

EXAMPLE 4 (Preparation of an ion conductive sol-gel composition containing the sol-gel precursor)

0.4 g of a HCl aqueous solution (0.15N), 1.1 g of an ethyl alcohol, 1.8 g of a DMF, 0.42 g of a TEOS (6 mmol), and 3.6 mmol of a PEG (number-average molecular weight 300) are added to 0.60 g of the precursor (3 mmol) obtained in Example 1 to give a reaction mixture which is then violently stirred at room temperature for 5 days. The mixture is stirred for one more day while the reaction temperature is kept at 60° C. The mixture is then concentrated at a reduced pressure until its weight is reduced by 30% to give a sol-gel composition with high viscosity.

Subsequently, 0.16 g of lithium trifluoromethane sulfonate (LiCF$_3$SO$_3$) is added to the composition which is then stirred at room temperature for 10 minutes, filtered by using 0.45 μm teflon syringe filter to produce an ion conductive sol-gel composition with viscosity suitable for casting.

EXAMPLES 5~25 (Preparation of an ion conductive sol-gel composition)

Sol-gel compositions are prepared in the same manner as in Example 4 except that the lithium salt, sol-gel precursor, TEOS and PEG are used in the amount indicated in Table 2 below.

TABLE 2

| Example | PEGTAS (mmol) | Ethanol (mmol) | 0.15 N HCl (mmol) | DMF (mmol) | LiCF$_3$SO$_2$ (molar ratio [EO]/[Li]) | TEOS (mmol) | PEG (mmol) |
|---|---|---|---|---|---|---|---|
| 5 | 1 | 8 | 8 | 2 | 35 | 2 | 0.4 |
| 6 | 1 | 8 | 8 | 2 | 25 | 2 | 0.4 |
| 7 | 1 | 8 | 8 | 2 | 20 | 2 | 0.4 |

TABLE 2-continued

| Example | PEGTAS (mmol) | Ethanol (mmol) | 0.15 N HCl (mmol) | DMF (mmol) | LiCF$_3$SO$_2$ (molar ratio [EO]/[Li]) | TEOS (mmol) | PEG (mmol) |
|---|---|---|---|---|---|---|---|
| 8 (comparison) | 0 | 8 | 8 | 2 | 15 | 2 | 0.4 |
| 9 | 0.1 | 8 | 8 | 2 | 15 | 2 | 0.4 |
| 10 | 0.3 | 8 | 8 | 2 | 15 | 2 | 0.4 |
| 11 | 1.5 | 8 | 8 | 2 | 15 | 2 | 0.4 |
| 12 | 1.8 | 8 | 8 | 2 | 15 | 2 | 0.4 |
| 13 | 1 | 8 | 8 | 2 | 15 | 0 | 0.4 |
| 14 | 1 | 8 | 8 | 2 | 15 | 0.5 | 0.4 |
| 15 | 1 | 8 | 8 | 2 | 15 | 1 | 0.4 |
| 16 | 1 | 8 | 8 | 2 | 15 | 1.5 | 0.4 |
| 17 | 1 | 8 | 8 | 2 | 15 | 2.5 | 0.4 |
| 18 | 1 | 8 | 8 | 2 | 15 | 3 | 0.4 |
| 19 | 1 | 8 | 8 | 2 | 15 | 2 | 0.2 |
| 20 | 1 | 8 | 8 | 2 | 15 | 2 | 0.22 |
| 21 | 1 | 8 | 8 | 2 | 15 | 2 | 0.26 |
| 22 | 1 | 8 | 8 | 2 | 15 | 2 | 0.28 |
| 23 | 1 | 8 | 8 | 2 | 15 | 2 | 0.3 |
| 24 | 1 | 8 | 8 | 2 | 15 | 2 | 0.35 |
| 25 | 1 | 8 | 8 | 2 | 15 | 2 | 0.5 |

EXAMPLES 26~27

Sol-gel compositions are prepared in the same manner as in Example 4 except that the sol-gel precursor prepared in Examples 2 and 3 is used respectively.

TABLE 3

| Example | PEGTAS (Mn of PEGMe) (mmol) | Ethanol (mmol) | 0.15 N HCl (mmol) | DMF (mmol) | LiCF$_3$SO$_2$ (molar ratio [EO]/[Li]) | TEOS (mmol) | PEG (mmol) |
|---|---|---|---|---|---|---|---|
| 26 | 1 (550) | 8 | 8 | 2 | 15 | 2 | 0.4 |
| 27 | 1 (750) | 8 | 8 | 2 | 15 | 2 | 0.4 |

EXAMPLES 28~31

Sol-gel compositions are prepared in the same manner as in Example 4 except that the number-average molecular weight of PEG is changed to 200, 400, 600 and 1000, respectively, and lithium perchlorate is used instead of lithium trifluoromethane sulfonate.

TABLE 4

| Example | PEGTAS (Mn of PEGMe) (mmol) | Ethanol (mmol) | 0.15 N HCl (mmol) | DMF (mmol) | LiCF$_3$SO$_2$ (molar ratio [EO]/[Li]) | TEOS (mmol) | PEG (mmol) |
|---|---|---|---|---|---|---|---|
| 28 | 1 (350) | 8 | 8 | 2 | 15 | 2 | 0.4(200) |
| 29 | 1 (350) | 8 | 8 | 2 | 15 | 2 | 0.4(400) |
| 30 | 1 (350) | 8 | 8 | 2 | 15 | 2 | 0.4(600) |
| 31 | 1 (350) | 8 | 8 | 2 | 15 | 2 | 0.4(1000) |

EXAMPLE 32

0.4 g of a HCl aqueous solution (0.15N), 1.1 g of an ethyl alcohol, 1.8 g of a DMF and 0.42 g of TEOS (6 mmol) are added to 0.60 g of the precursor (3 mmol) obtained in Example 1, which is then stirred at room temperature for 3 days (first mixture). 0.32 g of LiN(CF$_3$SO$_3$)$_2$ and 3.6 mmol of a PEGMe (number-average molecular weight=350) are mixed with 1.1 g of an ethyl alcohol and 1.8 g of DMF, stirred for 30 minutes while being heated at 50° C. The mixture is cooled to room temperature and mixed with the former mixture. Subsequently, the product is concentrated by distillating the solvent used in the sol-gel reaction and byproducts at a reduced pressure. When the weight of the mixture is reduced by 20%, a sol-gel composition with high viscosity is obtained.

EXAMPLE 33

A composition is prepared in the same manner as in Example 32 except that PEG having the number-average molecular weight of 8000 is used.

EXAMPLE 34

0.4 g of a HCl aqueous solution (0.15N), 1.1 g of an ethyl alcohol, 1.8 g of a DMF, 0.42 g of a TEOS (6 mmol) and 3.6 mmol of a PEG (number-average molecular weight Mn=600) are added to 0.6 g of the sol-gel precursor (3 mmol) obtained in Example 1 and then stirred at room temperature for 2 days. Subsequently, the reaction temperature is increased to 50° C. and the mixture is stirred for 12 hours. The resulted reaction mixture is concentrated by distillating at a reduced pressure. When the weight of the mixture is reduced by 30%, a sol-gel composition of high viscosity is obtained.

EXAMPLE 35

0.8g of a HCl aqueous solution (0.15N), 2.1 g of an ethyl alcohol, 2.8 g of a DMF, 0.9 g of a TEOS and 5.6 mmol of a PEGMe (number-average molecular weight of 550) are added to 1.60 g of the sol-gel precursor obtained in Example 2 and stirred at room temperature for 2 days, and then further stirred at 60° C. for 2 days. Subsequently, 0.35 g of lithium trifluoromethane sulfonate is added to the mixture and the mixture is then stirred at room temperature for 20 minutes. The reaction product is concentrated while being distilled at a reduced pressure to give a highly viscose composition.

EXAMPLE 36

The composition prepared in Example 4 is dropped onto an indium tin oxide (ITO) glass plate etched by about 1~2 mm in depth, and then the plate is rotated using the spin coating equipment manufactured by Laurell at 1000~2000 rpm for 60 seconds so that the plate is coated evenly by a thin film of a thickness of 80 μm. As such, the plate is kept at room temperature for 1 week, and thereafter, it is placed into a vacuum oven to be vacuum-dried for 8 hours while slowly increasing the temperature to 120° C. to prepare a clear polymeric thin film.

Figure 3:
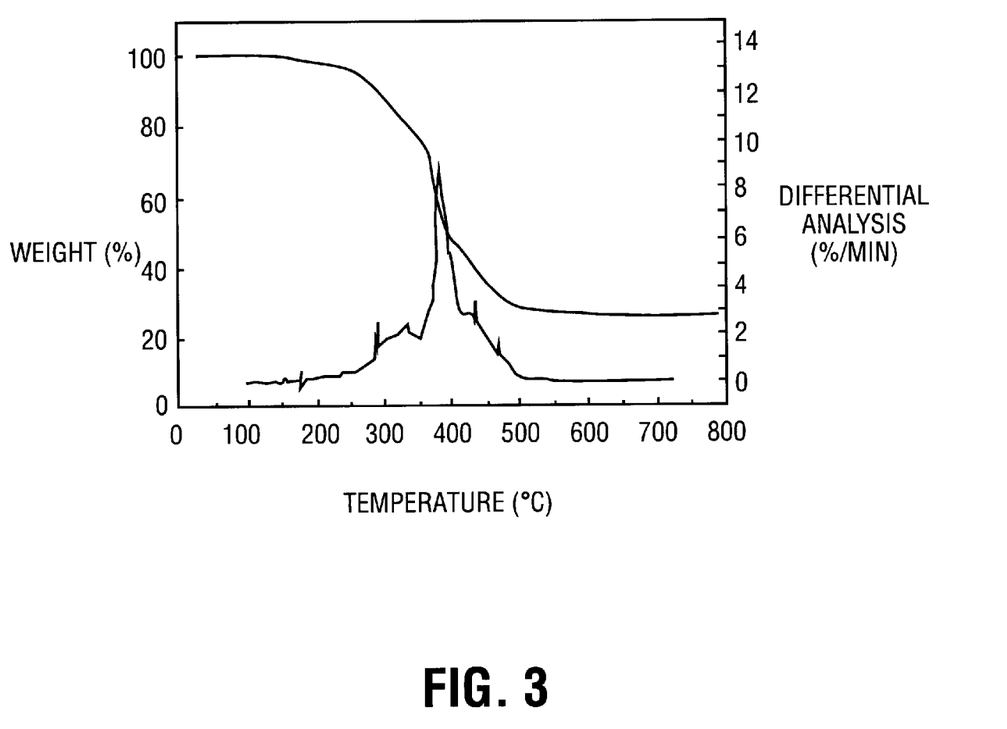

The thermal stability of the prepared polymeric ion conductive film is determined using the thermal weight heat analysis. The result thereof is shown in FIG. 3.

Ion Conductivity Experiment

The ion conductivity of the polymeric thin film so obtained is determined by removing solvents, volatile residues and water from the polymeric film with a vacuum pump, and then measuring its ion conductive resistance with an impedance measuring device. To reduce measurement error and ensure reproducibility, the ion conductivity is continuously measured at a reduced pressure until it is stabilized, the stabilized conductivity is then recorded. Optionally, if necessary, a sample of the polymeric film may be placed on a glass electrode inside the hot stage (FP 82HT) manufactured by Mettler which can precisely control the temperature of the sample to be within 0.2° C., and again, is placed inside a vacuum device to determine the change in conductivity with temperature change in situ. The impedance measuring device used is IM5d of Zahner Electrik. Impedance spectrum obtained is analyzed by an equivalence circuit to determine the resistance of the solid electrolytes.

The ion conductivity at room temperature of the solid electrolytes which comprises the polymeric ion conductive film of Example 36 determined by the above method is $1.4 \times 10^{-4}$ S/cm, and glass transition temperature is $-55°$ C.

EXAMPLES 37~51

Polymeric ion conductive films are prepared in the same manner as in example 36 except that the sol-gel compositions obtained in Examples 5~35 are used. The ion conductivity of the resulted polymeric ion conductive films at room temperature are determined. Table 5 below shows the ion conductivity and glass transition temperature of the polymeric ion conductive films with compositions used at room temperature.

TABLE 5

| Example | Composition | Tg (° C.) | Conductivity (S/cm) |
| --- | --- | --- | --- |
| 37 | Example 5 | −56 | $8.1 \times 10^{-6}$ |
| 38 | Example 6 | −49 | $5.2 \times 10^{-5}$ |
| 39 | Example 7 | −45 | $8.7 \times 10^{-5}$ |
| 40 | Example 10 | −36 | $4.1 \times 10^{-5}$ |
| 41 | Example 11 | −41 | $1.3 \times 10^{-4}$ |
| 42 | Example 12 | −45 | $8.7 \times 10^{-5}$ |
| 43 | Example 21 | −58 | $5.3 \times 10^{-5}$ |
| 44 | Example 31 | — | $4.6 \times 10^{-4}$ |
| 45 | Example 24 | −44 | $8.4 \times 10^{-5}$ |
| 46 | Example 25 | — | $5.0 \times 10^{-5}$ |
| 47 | Example 26 | — | $1.6 \times 10^{-4}$ |
| 48 | Example 27 | — | $1.0 \times 10^{-4}$ |
| 49 | Example 32 | — | $1.0 \times 10^{-3}$ |
| 50 | Example 34 | — | less than $1.0 \times 10^{-9}$ |
| 51 | Example 35 | — | $3.0 \times 10^{-4}$ |

EXAMPLE 52 (Comparative Example)

A polymeric ion conductive film is prepared in the same manner as in Example 36 using the sol-gel composition prepared in Example 8 (Comparative). The polymeric thin film prepared in this example is easily broken, has poor mechanical property, and has glass transition temperature of $-26°$ C. and ion conductivity of $3.1 \times 10^{-6}$ S/cm.

EXAMPLE 53 (Ion conductivity according to the temperature change)

The ion conductivity for the polymeric ion conductive films prepared in Examples 36, 47 and 48 above is measured respectively while the temperature is changed. The result thereof is shown in FIG. 4 which is a graph of the function of logarithmic ion conductivity and temperature (1000/T) (Examples 36 (●), 47 (Δ) and 48 (▼)).

Figure 4:
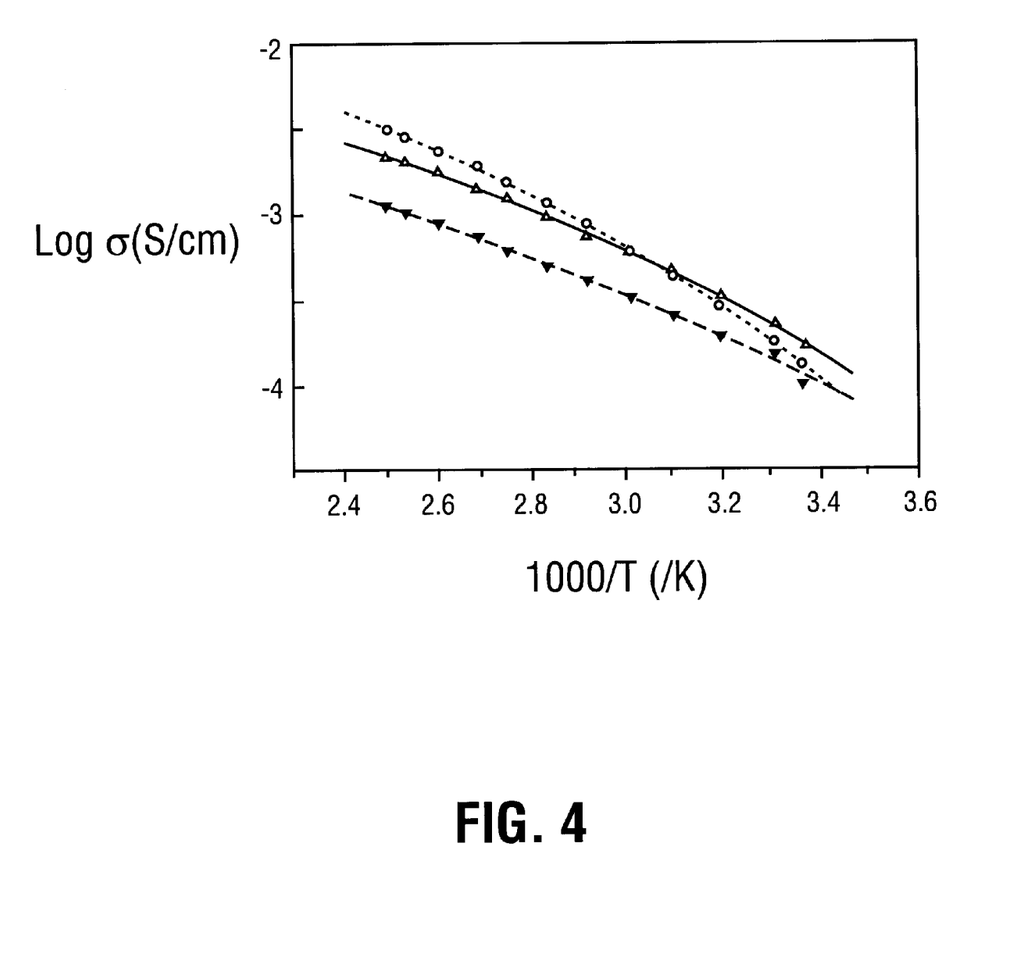

As indicated in FIG. 4, the polymeric ion conductive films show higher icon conductivity as the temperature increases. Their logarithmic ion conductivity illustrated in relation to the temperature in reciprocal shows a curved line instead of a straight line as indicated in FIG. 4. Moreover, the change in ion conductivity of the polymeric thin film prepared in Examples 47 and 48 with temperature change comes out to be less than that of Example 36.

EXAMPLE 54

The polymeric ion conductive film prepared in Example 50 is treated by immersion in 0.11 M lithium trifluoromethane sulfonate aqueous solution for 48 hours and then dried. The ion conductivity of such treated polymeric thin film at room temperature is $3 \times 10^{-5}$ S/cm.

EXAMPLE 55

0.2 g of polyvinyliden fluoride and 1 g of acetone are mixed with the composition obtained in Example 36. The mixture is coated on a support and dried to prepare a polymeric ion conductive film. The ion conductivity of the resulted polymeric thin film at room temperature is $8 \times 10^{-5}$ S/cm.

EXAMPLE 56

Sol-gel compositions are prepared in the same manner as in the example 25 except that 0.5 mole of PEG is changed to 0.8 mole of PEGMe (Mn=550). Polymeric electrolyte film prepared using the composition shows Tg of $-62°$ C. and ion conductivity at room temperature of $1.6 \times 10^{-4}$ s/cm.

The ion conductive film of the present invention has high ion conductivity, can be separated as free standing film after preparation, is electrochemically stable, has excellent adhesiveness when re-adhered, and thus can be used in lithium batteries and solid electrochemical devices.

What is claimed is:

1. A sol-gel composition comprising 1 to 90% by weight of a polyalkylene glycol-substituted trialkoxysilane of Formula 1, 10 to 95% by weight of a tetraalkoxysilane (TAOS), a hydochloric acid, an organic solvent, and a 1 to 90% by weight of a polyalkylene glycol of Formula 2 and/or an alkyl ether thereof and optionally 1 to 70% by weight of an alkali metal salt of Formula 3;

wherein Formula 1 is:

wherein Formula 2 is:

wherein Formula 3 is:

wherein:
R is a lower alkyl group having less than 10 carbon atoms;
X has a value of between 1 to 10;
$R^1$ is the same as R or $(CR^3{}_2—CR^3{}_2—O)_Y$—R where y has a value of 2 to 50;
$R^2$ is H or a lower alkyl group having less than 10 carbon atoms;
$R^3$ is H, $CH_3$, or F;
z has a value of 2 to 50;
$A^+$ represents a cation selected from the group consisting of $Li^+$, $Na^+$, and $K^+$; and
$B^-$ represents an anion selected from the group consisting of $ClO_4{}^-$, $CF_3SO_3{}^-$, $N(CF_3SO_3)_2{}^-$, $BF_4{}^-$, $PF_6{}^-$, and $AsF_6{}^-$.

2. The sol-gel composition according to claim 1, wherein the composition is obtained by stirring a mixture comprising a compound of Formula 1, TAOS, a hydrochloric acid, an organic solvent, and a compound of Formula 2 and optionally a salt of Formula 3, and then concentrating said mixture by 10 to 90% by weight in atmospheric pressure or in vacuum to gain high viscosity.

3. The sol-gel composition according to claim 1, wherein the organic solvent is at least one selected from the group consisting of ethanol, methanol, tetrahydrofuran, acetonitrile, N-methylpyrrolidone, dimethylformamide (DMF), propylene carbonate and dimethoxyethane, and is contained in an amount of 1 to 70% by weight relative to total weigh t of the composition.

4. The sol-gel composition according to claim 2, wherein the organic solvent is at least one selected from the group consisting of ethanol, methanol, tetrahydrofuran, acetonitrile, N-methylpyrrolidone, dimethylformamide (DMF), propylene carbonate and dimethoxyethane and is contained in an amount of 1 to 70% by weight relative to total weight of the composition.

5. The sol-gel composition according to claim 1, further comprising one or more components selected from the group consisting of silica, a carbon black, a natural graphite, an artificial graphite, an ethylene-propylene-diene terpolymer (EPDM) and a polyvinylfluoride (PVdF).

6. The sol-gel composition according to claim 2, further comprising one or more components selected from the group consisting of silica, a carbon black, a natural graphite, an artificial graphite, an ethylene-propylene-diene terpolymer (EPDM) and polyvinylfluoride (PVdF).

7. The sol-gel composition according to claim 1, wherein the polyalkylene glycol-substituted trialkoxysilane is a polyethylene glycol-substituted trialkoxysilane.

8. The sol-gel composition according to claim 2, wherein the polyalkylene glycol-substituted trialkoxysilane is a polyethylene glycol-substituted trialkoxysilane.

9. The sol-gel composition according to claim 1, wherein the tetraalkoxysilane is tetraethoxysilane.

10. The sol-gel composition according to claim 2, wherein the tetraalkoxysilane is tetraethoxysilane.

11. The sol-gel composition according to claim 1, wherein the alkali metal is a lithium.

12. The sol-gel composition according to claim 2, wherein the alkali metal is a lithium.

13. A method for preparing the sol-gel composition according of claim 1, comprising the step of mixing of a polyalkylene glycol-substituted trialkoxysilane of Formula 1, a tetraalkoxysilane (TAOS), a hydrochloric acid, an organic solvent, a polyalkylene glycol of Formula 2 and/or an alkyl ether thereof, and optionally further mixing an alkali metal salt of Formula 3.

14. The method according to claim 13, wherein the sol-gel composition is stirred at a temperature from room temperature to 130° C. before or after adding the alkali metal salt, and wherein the sol-gel composition is concentrated by 10 to 90% by weight in atmospheric pressure or at a reduced pressure to prepare a sol-gel composition with high viscosity.

15. A polymeric ion conductive film having an ion conductivity of $10^{-3}$~$10^{-8}$ S/cm at room temperature, prepared by coating the ion conductivity sol-gel composition of claim 1 onto an electrode or support using a solution processing method selected from the group consisting of spin-coating, casting, deep-coating and bar-coating.

16. The polymeric ion conductive film according to claim 15, which is prepared by further adding a plasticizer, a thickening agent, a hardener or other ion conductive polymers to the ion-conductive sol-gel compositions.

17. The polymeric ion conductive film according to claim 15, which is further treated by immersion of the polymeric ion conductive film in solution where electrolytic salt is dissolved.

18. The polymeric ion conductive film according to claim 16, which is further treated by immersion of the polymeric ion conductive film in solution where electrolytic salt is dissolved.

* * * * *

UNITED STATES PATENT AND TRADEMARK OFFICE
CERTIFICATE OF CORRECTION

PATENT NO. : 6,172,152 B1
DATED : January 9, 2001
INVENTOR(S) : Kim et al.

It is certified that error appears in the above-identified patent and that said Letters Patent is hereby corrected as shown below:

Column 8,
Line 62, "TABLE 2" please replace "$LiCF_3SO_2$" with -- $LiCF_3SO_3$ --.

Column 9,
Line 5, "TABLE 2" please replace "$LiCF_3SO_2$" with -- $LiCF_3SO_3$ --.
Line 33, "TABLE 3" please replace "$LiCF_3SO_2$" with -- $LiCF_3SO_3$ --.
Line 51, "TABLE 4" please replace "$LiCF_3SO_2$" with -- $LiClO_4$ --.

Signed and Sealed this

Twenty-sixth Day of February, 2002

Attest:

JAMES E. ROGAN
*Attesting Officer*     *Director of the United States Patent and Trademark Office*